United States Patent

Spittle et al.

[11] Patent Number: 6,076,299
[45] Date of Patent: Jun. 20, 2000

[54] MULCHING PELLETS

[75] Inventors: Kevin Spittle, Stanley, N.C.; Gary B. Bowers, Johnson City, Tenn.

[73] Assignee: Fibert Products Company, Limestone, Tenn.

[21] Appl. No.: 08/795,253

[22] Filed: Feb. 10, 1997

[51] Int. Cl.[7] ................................................ A01G 7/00
[52] U.S. Cl. ................................................................ 47/9
[58] Field of Search ...................................................... 47/9

[56] References Cited

U.S. PATENT DOCUMENTS

| | | | |
|---|---|---|---|
| 2,035,286 | 3/1936 | Wenzel | 47/9 |
| 2,163,860 | 6/1939 | White | 47/9 |
| 3,099,897 | 8/1963 | Lefferon | 47/9 |
| 3,269,824 | 8/1966 | Aswell | 47/9 |
| 3,303,609 | 2/1967 | MacHenry | 47/9 |
| 4,067,140 | 1/1978 | Thomas | 47/9 |
| 4,337,077 | 6/1982 | Rutherford | 47/9 |
| 4,767,440 | 8/1988 | Salac | 47/9 |
| 5,175,131 | 12/1992 | Lang et al. | 47/9 |
| 5,456,733 | 10/1995 | Hamilton, Jr. | 47/9 |
| 5,463,830 | 11/1995 | Pien et al. | 47/9 |
| 5,472,475 | 12/1995 | Adam | 47/9 |
| 5,585,150 | 12/1996 | Sheehan | 47/9 |
| 5,653,053 | 8/1997 | Handley | 47/9 |
| 5,916,027 | 6/1999 | Spittle | 47/9 |

*Primary Examiner*—Michael J. Carone
*Assistant Examiner*—Joanne Downs
*Attorney, Agent, or Firm*—Brooks & Kushman PC

[57] ABSTRACT

Mulching pellets made from fmely divided paper and wood, a clay binder, a highly water absorbent natural polymer, and a surfactant. The pellets absorb at least four times their weight in water. The pellets substantially reduce water run-off and soil erosion as compared to other mulch pellets.

21 Claims, No Drawings

# 6,076,299

MULCHING PELLETS

FIELD OF THE INVENTION

This invention relates to mulching pellets which effectively mulch a seed bed.

BACKGROUND OF THE INVENTION

Seed bed mulches accomplish a number of functions. They protect the soil and seed from water and wind erosion, reduce evaporation from the soil surface, increase the humidity of the soil, moderate temperature fluctuations at the soil surface, and dissipate the energy of falling water droplets to decrease disturbance of the soil surface.

There are many types of mulch available. Straw and hay are somewhat effective, but contaminate the seed bed with weed seeds. Hydro-mulch requires mixing and spray application equipment. Pelletized mulches are weed-free, and can be applied with standard rotary or drop spreaders. However, such mulches are fairly dense. Because of the density, it would be necessary to apply these mulches at an extremely high rate in pounds per area in order to cover a substantial amount of the seed bed area. Consequently, mulch pellets are applied to cover only a portion of the seed bed. As a result, they are not as effective as other mulches in protecting the underlying seed bed.

SUMMARY OF THE INVENTION

It is therefore an object of this invention to provide mulching pellets which better protect the underlying seed bed.

It is a further object of this invention to provide such mulching pellets which decrease soil erosion as compared to other mulching pellets.

It is a further object of this invention to provide such mulching pellets which increase water retention as compared to other mulching pellets.

It is a further object of this invention to provide such mulching pellets which cover more of the seed bed than the same amount of other mulching pellets.

It is a further object of this invention to provide such mulching pellets which have more contact area with the seed bed than other mulching pellets.

This invention features mulching pellets for application to a ground surface, comprising finely-divided paper, finely-divided wood, a water-absorbent polymer, and a surfactant, wherein the paper, wood, polymer and surfactant are intimately mixed and formed into pellets for application to a ground surface.

The finely-divided paper may be made from waste paper. The mulching pellets preferably include at least about 50% paper. The finely-divided wood may be sawdust. The mulching pellets preferably include at least about 15% wood. The polymer may be guar gum. The mulching pellets preferably include at least about 1% polymer. The surfactant may be polyalkylene glycol. The mulching pellets preferably include at least about 0.2% surfactant.

The mulching pellets may further include clay particles. The mulching pellets preferably include at least about 10% clay particles. The mulching pellets may also further include a seaweed extract plant growth stimulant. The mulching pellets preferably include at least about 0.1% seaweed extract growth stimulant. The mulching pellets may be about ³⁄₁₆" in diameter, with an average length of less than about ¼". The mulching pellets are preferably formulated so that they retain at least about four times their weight in water.

This invention also features mulching pellets for application to a ground surface, comprising at least about 50% finely-divided paper, at least about 15% finely-divided wood, at least about 1% water-absorbing polymer, and at least about 0.2% surfactant, wherein the paper, wood, polymer and surfactant are intimately mixed and formed into pellets for application to a ground surface. These mulching pellets also preferably further include at least about 10% clay particles, and at least about 0.1% plant growth stimulant, and retain at least about four times their weight in water.

In a more specific embodiment, this invention features mulching pellets for application to a ground surface, comprising at least about 50% finely-divided paper, at least about 15% finely-divided wood, at least about 10% clay particles, about 1% water absorbing polymer, and about 0.3% surfactant, wherein the paper, wood, clay, polymer and surfactant are intimately mixed and formed into pellets for application to a ground surface. Such mulching pellets can retain at least about four times their weight in water. The mulching pellets may have a density of about 25 to 30 pounds per cubic foot.

DESCRIPTION OF THE PREFERRED EMBODIMENTS

The mulching pellets of this invention are far superior in protecting the seed bed from erosion, as compared to other mulching pellets. This is due to a number of factors, including the lower density which allows the pellets to be spread more thickly than other pellets, thus covering more of the seed bed surface, and so protecting the surface more effectively from water and wind. Another factor is the greater water retention of the inventive mulching pellets, which provides superior erosion control and seed bed hydration due to both the amount of retained water on the seed bed, as well as the expansion of the mulching pellets due to their water retention.

The mulching pellets of this invention comprise an intimately-mixed formulation of finely-divided paper, finely-divided wood, a water-absorbent polymer, and a surfactant. In the preferred embodiment, the mulching pellets also include clay particles as a pellet binder. Additional components of the pellets may include a plant growth stimulant, and a dye.

The finely-divided paper and wood are extremely water absorbent in and of themselves. The addition of a surfactant increases the water retention of the paper and wood particles, and also speeds water absorption. It can double water retention and increase the absorption rate 20 fold. Because so much water is absorbed by the pellets, the pellets expand tremendously, resulting in the coverage of an even greater percentage of the seed bed area, which then provides greater protection to the seed bed from water and wind. Additionally, the extreme water absorption reduces water runoff, therefore reducing soil loss.

The mulching pellets also include a water-absorbent polymer. A preferred polymer is guar gum. The polymer absorbs water, and helps to hold the pellet together, and keep it from falling apart as it swells as it absorbs water. The polymer also increases the stickiness of the water-saturated pellets, which helps to retain them in place on the seed bed.

The preferred embodiment mulching pellets also include clay particles. The clay acts as a binder to hold wood and paper of the pellets together both during the manufacturing process, and in the finished product. This allows the pellets to be less compact than other paper-based pellets, thereby reducing the bulk density of the pellets, which allows the pellets to cover a greater percentage of the seed bed area as opposed to the same weight of more dense mulching pellets. The clay also can act as a binder for performance-enhancing chemicals, such as fertilizer, bio-stimulant and/or chelating agents.

One preferred embodiment of the mulching pellets of this invention includes: at least about 50% finely-divided paper, and more preferably 54%±2%; at least about 15% finely-divided wood, and more preferably 20%±2%; at least about 1% guar gum (a natural water-absorbing polymer), and more preferably 1%±0.2%; at least about 0.2% polyalkylene glycol (a surfactant), and more preferably 0.3%±0.1%. To promote plant development and growth, the mulching pellets may include a bio-stimulant, such as cold water processed *Ascophyllum Nodosum*, which is a seaweed extract. Finally, the mulching pellets may include about 0.4% dark green marker dye.

These mulching pellets were produced as follows. Waste newspapers were shredded and processed through a hammer mill. The resulting paper pieces were then introduced into a finish hammer mill. Also added to the finish hammer mill were the appropriate amounts of sawdust, clay particles, and guar gum powder. The approximate sizes of these components added to the finish hammer mill was as follows. The paper was pieces about ¼ to ¾ inch in length, the sawdust passed through a 20 mesh screen, and the clay passed through a 300 mesh screen. The mixture exiting the finish hammer mill had added to it the correct amount of marker dye. The liquid surfactant was then added to the mixture of solids.

The entire mixture was then processed through a conditioner, in which the correct amount of moisture was sprayed into the mixture as a fine mist as the product is agitated. The mixture was then pelletized into pellets of 3/16 inch diameter, with a length of about 1-¼ inches. The pellets had a bulk density of about 45–50 pounds per cubic foot. The product was then cooled, to harden and dry the outside skin, to prevent mold growth, and keep the pellets from breaking apart during shipping and application.

The pellets were then passed through a roller mill, which broke the pellets into smaller, less dense pieces, having a bulk density of about 25–30 pounds per cubic foot. The roller mill was a model SP900-24 roller mill from Roskamp Champion of Waterloo Iowa. The rolls were corrugated with diagonal grooves, model 6/8 RBV 5 Deg. 1.5:1 differential.

Mulching pellets according to the preferred embodiment were tested against paper-based mulching pellets in a controlled university testing situation. The mulching pellets of this invention tested as set forth below had the following composition.

| Component | Percentage (by weight) |
|---|---|
| Waste paper | 54 ± 2% |
| Sawdust | 20 ± 2% |
| Clay Particles | 15 ± 2% |
| Moisture | 10 ± 2% |
| Guar Gum | 1 ± 0.2% |
| Polyalkylene Glycol Surfactant | 0.3 ± 0.1% |

-continued

| Component | Percentage (by weight) |
|---|---|
| Dye | 0.4 ± 0.1% |
| Seaweed Extract | 0.1 ± 0.1% |

The inventive mulching pellets had a bulk density of about 25–30 pounds per cubic foot, and on average were short generally cylindrical pieces having a diameter of about 3/16", and a length of up to about ¼". Because of these dimensions, the pellets had fairly large, relatively flat ends, which tended to prevent the pieces from rolling on sloped ground. Also, they had more contact area with the soil, and greater surface area, as compared to the Pennmulch pellets, thus absorbing water faster and covering more of the seed bed.

These pellets were tested against a commercially-available paper-based mulching pellet which includes a synthetic water-absorbing co-polymer. The product is known as "Pennmulch" seed establishment mulch available from Pennturf Products, Inc., State College, Pa. This product, which is sold as cylindrical pieces, had a diameter of about ⅛ of an inch, and a length of up to about ½ inch. Their long, thin, cylindrical shape tended to allow the pellets to roll on sloped ground, which can cause less soil coverage. The density of this product is about 35–40 pounds per cubic foot. Because of the higher density, this product, when applied at the same rate in pounds per square foot of seed bed as the inventive pellets, covers substantially less of the seed bed, and accordingly does not protect the seed bed as well as the inventive pellets.

The two types of mulching pellets were tested in three sets of side-by-side test plots with a rainfall simulator which provided precise control over the rainfall rate. Both products were applied at the same rate of 75 pounds per 1000 square feet of identical seed bed in a test bed which fully separated each test plot. The rainfall intensity was 4 inches per hour. The test lasted 30 minutes.

The plots were placed at a 3:1 slope. Sediment and water leaving each test plot were collected and weighed together. After the sediment had settled, the clean water was filtered from the containers and measured, and the sediment was dried and weighed.

After the rainfall simulation ended, a sunlight simulator was used continuously for 7 days. Two samples, each approximately 1 square foot in area, were then gathered from the upper one-third of each plot, one from the center of each plot, and one from the lower third of each plot. For each sample, the plants were counted, measured, dried, and weighed, and counts were made in each sample area of seeds that did not germinate.

The results from the testing follow in Tables 1–3.

TABLE 1

Water runoff and soil erosion data. Slope = 3:1. Rainfall = 4 in/hr.

| Test | Plot | Material | Collect, time (hr) | Water weight, lb | Soil weight, lb | Water runoff rate, gal/hr | Soil erosion rate, lb/hr |
|---|---|---|---|---|---|---|---|
| 1 | 1 | Inventive Pellets | 0.50 | 118.80 | 3.188 | 28.49 | 6.38 |
| 1 | 2 | Pennmulch Pellets | 0.50 | 121.10 | 5.575 | 29.04 | 11.15 |
| 1 | 3 | Inventive Pellets | 0.50 | 116.70 | 12.010 | 27.99 | 24.02 |
| 1 | 4 | Pennmulch Pellets | 0.50 | 178.50 | 9.017 | 42.81 | 18.03 |

TABLE 1-continued

Water runoff and soil erosion data. Slope = 3:1. Rainfall = 4 in/hr.

| Test | Plot | Material | Collect, time (hr) | Water weight, lb | Soil weight, lb | Water runoff rate, gal/hr | Soil erosion rate, lb/hr |
|---|---|---|---|---|---|---|---|
| 1 | 5 | Inventive Pellets | 0.50 | 103.30 | 5.637 | 24.77 | 11.27 |
| 1 | 6 | Pennmulch Pellets | 0.50 | 179.00 | 14.293 | 42.93 | 28.59 |
| Average | | Inventive Pellets | | | | 27.08 | 13.89 |
| | | Pennmulch Pellets | | | | 38.26 | 19.26 |

TABLE 2

Number of plants and plant height data. Slope = 3:1. Rain = 4 in/hr.

| Test-Plot | Material | Number of Plants | | | | Plant Height (cm) | | | Average h (cm) |
|---|---|---|---|---|---|---|---|---|---|
| | | Top | Middle | Bottom | Total | Top | Middle | Bottom | |
| 1-1 | Inventive Pellets | 79 | 90 | 81 | 250 | 11.86 | 12.23 | 11.54 | 11.89 |
| 1-2 | Pennmulch Pellets | 77 | 75 | 58 | 210 | 12.14 | 12.78 | 12.07 | 12.35 |
| 1-3 | Inventive Pellets | 68 | 48 | 88 | 204 | 13.11 | 12.59 | 11.23 | 12.18 |
| 1-4 | Pennmulch Pellets | 87 | 57 | 52 | 196 | 11.53 | 12.28 | 10.70 | 11.53 |
| 1-5 | Inventive Pellets | 94 | 81 | 59 | 234 | 11.25 | 12.03 | 11.93 | 11.69 |
| 1-6 | Pennmulch Pellets | 95 | 72 | 57 | 224 | 11.22 | 12.48 | 11.75 | 11.76 |
| Ave. | Inventive Pellets | 80 | 73 | 76 | 229 | 11.97 | 12.23 | 11.52 | 11.91 |
| | Pennmulch Pellets | 86 | 68 | 56 | 210 | 11.60 | 12.53 | 11.53 | 11.88 |

TABLE 3

Dry weight of plants and percentage of seed data. Slope = 3:1. Rain = 4 in/hr.

| Test-Plot | Material | Dry weight (gm/sample) | | | | (gm/plot) | Percentage of Seed | | | |
|---|---|---|---|---|---|---|---|---|---|---|
| | | Top | Middle | Bottom | Total | | lost | germi. | non-g. | check |
| 1-1 | Inventive Pellets | 0.91 | 1.00 | 0.80 | 2.71 | 22.43 | 10.61 | 75.76 | 13.64 | 100. |
| 1-2 | Pennmulch Pellets | 0.79 | 0.84 | 0.62 | 2.25 | 18.62 | 18.48 | 63.64 | 17.88 | 100. |
| 1-3 | Inventive Pellets | 0.84 | 0.65 | 0.85 | 2.34 | 19.37 | 21.52 | 61.82 | 16.67 | 100. |
| 1-4 | Pennmulch Pellets | 0.88 | 0.64 | 0.52 | 2.04 | 16.88 | 27.58 | 59.39 | 13.03 | 100. |
| 1-5 | Inventive Pellets | 0.82 | 0.94 | 0.52 | 2.28 | 18.87 | 9.09 | 70.91 | 20.00 | 100. |
| 1-6 | Pennmulch Pellets | 0.91 | 0.83 | 0.58 | 2.32 | 19.20 | 13.03 | 67.88 | 19.09 | 100. |
| Ave. | Inventive Pellets | 0.86 | 0.86 | 0.72 | 2.44 | 20.22 | 13.74 | 69.49 | 16.77 | 100. |
| | Pennmulch Pellets | 0.86 | 0.77 | 0.57 | 2.20 | 18.23 | 19.70 | 63.64 | 16.67 | 100. |

It is apparent from the data that the inventive pellets retained more soil and more water than the other pellets. A larger percentage of seed was retained. Germination rates were greater. Average plant height and dry weight of plants was slightly larger.

The results were even more dramatic when the inventive pellets were applied at a rate of 100 pounds per 1000 square feet. The water runoff rate decreased to an average of about 12 gallons per hour, and the soil erosion rate was reduced to an average of about 2 pounds per hour, both under the same conditions as above.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. Mulching pellets for application to a ground surface, comprising:

finely-divided paper;

finely-divided wood;

a water-absorbent polymer comprising guar gum; and a surfactant;

wherein said paper, wood, polymer and surfactant are intimately mixed and formed into pellets for application to a ground surface, said pellets having a bulk density of about 25–30 pounds per cubic foot.

2. The mulching pellets of claim 1 in which said finely-divided paper includes waste paper.

3. The mulching pellets of claim 1 in which the pellets include at least about 50% paper.

4. The mulching pellets of claim 1 in which said finely-divided wood includes sawdust.

5. The mulching pellets of claim 1 in which the pellets include at least about 15% wood.

6. The mulching pellets of claim 1 in which the pellets include at least about 1% polymer.

7. The mulching pellets of claim 1 in which said surfactant includes polyalkylene glycol.

8. The mulching pellets of claim 1 in which the pellets include at least about 0.2% surfactant.

9. The mulching pellets of claim 1 further including clay particles.

10. The mulching pellets of claim 9 in which the pellets include at least about 10% clay particles.

11. The mulching pellets of claim 1 further including a seaweed extract plant growth stimulant.

12. The mulching pellets of claim 11 in which the pellets include at least about 0.1% seaweed extract growth stimulant.

13. The mulching pellets of claim 1 in which the mulching pellets are about 3/16" in diameter.

14. The mulching pellets of claim 13 in which the mulching pellets average length is less than about 1/4".

15. The mulching pellets of claim 1 in which the mulching pellets can retain at least about four times their weight in water.

16. Mulching pellets for application to a ground surface, comprising:

at least about 50% finely-divided paper;

at least about 15% finely-divided wood;

at least about 1% water-absorbing polymer comprising guar gum; and at least about 0.2% surfactant;

wherein said paper, wood, polymer and surfactant are intimately mixed and formed into pellets for application to a ground surface, said pellets having a bulk density of about 25–30 pounds per cubic foot.

17. The mulching pellets of claim 16 further including at least about 10% clay particles.

18. The mulching pellets of claim 16 further including at least about 0.1% plant growth stimulant.

19. The mulching pellets of claim 16 in which the mulching pellets can retain at least about four times their weight in water.

20. Mulching pellets for application to a ground surface, comprising:

at least about 50% finely-divided paper;

at least about 15% finely-divided wood;

at least about 10% clay particles;

about 1% water-absorbing polymer comprising guar gum; and about 0.3% surfactant;

wherein said paper, wood, clay, polymer and surfactant are intimately mixed and formed into pellets for application to a ground surface, said pellets having a bulk density of about 25–30 pounds per cubic foot.

21. The mulching pellets of claim 20 in which the mulching pellets can retain at least about four times their weight in water.

* * * * *